United States Patent
Mercuri et al.

(10) Patent No.: US 8,974,303 B2
(45) Date of Patent: Mar. 10, 2015

(54) AD-HOC USER AND DEVICE ENGAGEMENT PLATFORM

(75) Inventors: Marc E. Mercuri, Bothell, WA (US); James O. Tisdale, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 13/330,679

(22) Filed: Dec. 20, 2011

(65) Prior Publication Data

US 2013/0157693 A1 Jun. 20, 2013

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .... 463/40; 463/1; 463/29; 463/42; 455/414.1

(58) Field of Classification Search
USPC ......... 455/456.1, 456.2, 456.3; 463/1, 29, 40, 463/42
See application file for complete search history.

(56) References Cited

U.S. PATENT DOCUMENTS

| | | | |
|---|---|---|---|
| 8,814,692 B2 * | 8/2014 | Konkle | 463/42 |
| 2002/0042293 A1 * | 4/2002 | Ubale et al. | 463/9 |
| 2004/0171381 A1 * | 9/2004 | Inselberg | 455/426.2 |
| 2004/0254018 A1 * | 12/2004 | Priestar | 463/42 |
| 2006/0094409 A1 * | 5/2006 | Inselberg | 455/414.1 |
| 2006/0154657 A1 * | 7/2006 | Inselberg | 455/418 |
| 2006/0173701 A1 | 8/2006 | Gurvey | |
| 2006/0252532 A1 * | 11/2006 | Stovall | 463/30 |
| 2007/0099701 A1 * | 5/2007 | Simon et al. | 463/40 |
| 2007/0197247 A1 * | 8/2007 | Inselberg | 455/517 |

(Continued)

OTHER PUBLICATIONS

"Real-Time Experiences", Retrieved at <<http://loyalize.com/real_time_experiences.html>>, Retrieved Date: Jun. 24, 2011, pp. 2.

(Continued)

*Primary Examiner* — Magdi Elhag
(74) *Attorney, Agent, or Firm* — Dan Choi; Judy Yee; Micky Minhas (57) ABSTRACT

A local engagement system is described herein that leverages devices people commonly carry with them to dynamically engage them based on their locations and/or activities. One goal of the above referenced system is to leverage the power of the various devices present while providing the audience with a chance to better engage and participate with each other. A side benefit is additional opportunities to market products and services in new and exciting ways. The system includes a presentation component at the event or venue that links to existing systems, a web interface, and optional individual client applications for the devices. Thus, the local engagement system provides a highly engaging experience to people that might otherwise be idle and provides an enhanced opportunity for advertisers or educators to reach the people and give them something entertaining to do.

18 Claims, 3 Drawing Sheets

(56) References Cited

U.S. PATENT DOCUMENTS

| | | | |
|---|---|---|---|
| 2007/0202900 A1* | 8/2007 | Inselberg | 455/500 |
| 2009/0156179 A1* | 6/2009 | Hahn et al. | 455/414.1 |
| 2009/0276292 A1* | 11/2009 | Inselberg | 705/10 |
| 2010/0131443 A1 | 5/2010 | Agarwal et al. | |
| 2010/0205049 A1 | 8/2010 | Long et al. | |
| 2010/0306064 A1 | 12/2010 | Inselburg | |
| 2011/0070942 A1* | 3/2011 | Mehta et al. | 463/23 |
| 2011/0093326 A1 | 4/2011 | Bous et al. | |
| 2011/0269520 A1* | 11/2011 | Amaitis et al. | 463/16 |
| 2012/0165100 A1* | 6/2012 | Lalancette et al. | 463/42 |
| 2012/0290109 A1* | 11/2012 | Engelberg et al. | 700/91 |

OTHER PUBLICATIONS

Leach-Kemon, "5 Steps to Leveraging Promoted Tweets for Event Promotion", Retrieved at <<http://www.optify.net/social-media/5-steps-promoted-tweets-event-promotion/>>, Mar. 3, 2011, pp. 2.

"Next-Wave Event Technology", Retrieved at <<http://www.meetingscanada.com/content/next-wave-event-technology-22816>>, Retrieved Date: Jun. 24, 2011, pp. 5.

* cited by examiner

AD-HOC USER AND DEVICE ENGAGEMENT PLATFORM

BACKGROUND

Marketers are constantly searching for ways to reach target groups of people. This is often done through advertising, promotional materials, contests, product giveaways, coupons, and various other ways. Marketers often have target demographics of users that they want to reach, which may include criteria related to age, gender, income level, social circles, past purchase history, geographic location, and so forth. Online and other types of advertising often take steps to reach a particular target audience. For example, web-based search advertising uses the keywords of a query to determine interests of a user, and may use a stored user profile to obtain further information about the user for targeting displayed advertisements. In this way, advertising systems can display advertisements that are relevant to the user in general and that are relevant to the user's current topic of interest.

It is also common for people to have idle time during which they are willing to be entertained, educated, and will readily accept some level of marketing in return for the entertainment or education. A common example is trivia questions that are displayed in movie theaters before a movie starts. This is idle time for most people, and the theater can display advertisements along with questions for the crowd to think about or fun facts that are memorable to the crowd waiting to see the movie. The theater knows some information about the people based on what movie they are waiting to see (e.g., a family movie and an action movie attract different demographics). Often such advertising is done through static displays, such as a displayed logo on the screen, the cups, and other merchandise that people purchase, and so on.

However, there is not a unified way to dynamically reach people in such crowds. While waiting for live events to take place, such as a movie, concert, or sporting event there is an opportunity to engage the audience for education or advertising. You can see this today with the multimedia slide shows or videos before a movie that provide programming and advertisements or the half-time or mid-inning programming on the scoreboards for sporting events. While entertaining, these are not typically as engaging as the types of entertainment found on their phones or other mobile devices. Users today are spending more and more time reading information (e.g., checking email or social networks) on their mobile devices during such idle time than engaging in the venue activities.

SUMMARY

A local engagement system is described herein that leverages devices people commonly carry with them to dynamically engage them based on their locations and/or activities. One goal of the above referenced system is to leverage the power of the various devices present while providing the audience with a chance to better engage and participate with each other. A side benefit is additional opportunities to market products and services in new and exciting ways. In some embodiments, the system is comprised of a cloud back-end that provisions content by individual location or venue as well as acting as a hub for the devices participating at that venue. The system includes a presentation component at the event or venue that links to existing systems, a web interface, and optional individual client applications for the devices. With consistent identities across multiple events, there is an opportunity for "rivals", for long-term relationships between sponsors and individuals, and the opportunity through the system to have applications or offers downloaded before, during, or after the event. In addition, for signed in users the system and advertisers can collect additional information and provide location-specific offers and advertisements. Thus, the local engagement system provides a highly engaging experience to people that might otherwise be idle and provides an enhanced opportunity for advertisers or educators to reach the people and give them something entertaining to do.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A local engagement system is described herein that leverages devices people commonly carry with them to dynamically engage them based on their locations and/or activities. One goal of the above referenced system is to leverage the power of the various devices present while providing the audience with a chance to better engage and participate with each other. A side benefit is additional opportunities to market products and services in new and exciting ways. In some embodiments, the system is comprised of a cloud back-end that provisions content by individual location or venue as well as acting as a hub for the devices participating at that venue. The system includes a presentation component at the event or venue that links to existing systems (i.e., projector, scoreboard, or screen), a web interface, and optional individual client applications for the devices. This system can be combined with existing engagement systems such as MICROSOFT™ TownHall in order to provide a consistent identity as well as points and badges that carry over between separate events.

Following is an example scenario of a user being engaged with the local engagement system. The user walks into a theater before a movie and sees a message projected on the movie screen that a quiz game will start shortly. The user follows instructions on the screen to download a mobile device application from the web or an application store to the user's mobile device (e.g., a phone, tablet, or other device). The user chooses to sign in to get credit for the user's score. The user picks a screen name for this game that will be projected to others. Many users may do this at the same time or over a period of several minutes. Soon the game starts. A question is presented in the theater with multiple possible answers. When the question appears, on the screen of the user's phone are large buttons for each of several multiple-choice answers. The user quickly hits "B" and the user's answer is transmitted to the cloud, aggregated with other users' answers, and results are sent back to the theater where the user's chosen screen name is displayed as the quickest correct answer. For those who opted to sign in and who won, an activity sponsor may provide discounts or prizes.

With consistent identities across multiple events, there is an opportunity for "rivals", for long-term relationships between sponsors and individuals, and the opportunity through the system to have applications or offers downloaded before, during, or after the event. Along with "rivals", there may be an opportunity to connect to a participant's social graph so that they can invite, interact, and participate against their friends or other groups. In this way, there can be multiple layers of competition and recognition for participation. In addition, for signed in users the system and advertisers can collect additional information (e.g., user demographic information and history) and provide location-specific offers and advertisements. Thus, the local engagement system provides a highly engaging experience to people that might otherwise be idle and provides an enhanced opportunity for advertisers or educators to reach the people and give them something entertaining to do.

Figure 1:
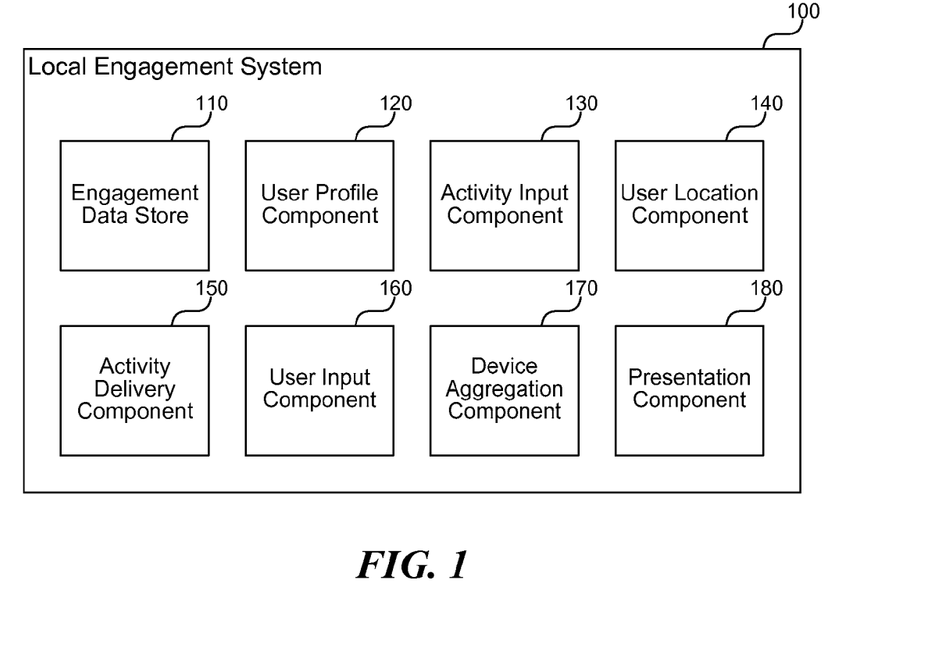
FIG. 1 is a block diagram that illustrates components of the local engagement system, in one embodiment.

FIG. 1 is a block diagram that illustrates components of the local engagement system, in one embodiment. The system 100 includes an engagement data store 110, a user profile component 120, an activity input component 130, a user location component 140, an activity delivery component 150, a user input component 160, a device aggregation component 170, and a presentation component 180. Each of these components is described in further detail herein.

The engagement data store 110 stores one or more activities to dynamically engage users at an identified location. The data store 110 may include one or more files, file systems, hard drives, databases, storage area networks, cloud-based storage services, or other facilities for persisting data over time. The stored information identifies one or more activities and criteria associated with each activity, such as a venue/location to which to deliver the activity, a start time and/or duration for the activity, any user criteria for participating in the activity, and so forth. Activities can be targeted to a specific location (e.g., a movie theater or concert hall), to specific types of users (e.g., males over 30), to specific times (e.g., before a particular movie starts), and so forth. Activities are input by sponsors and their administrative representatives through the activity input component 130 described herein. During an activity, the activity delivery component 150 and other components access the engagement data store 110 to access activity information and to host the activity for any participating users.

The user profile component 120 stores user profile information that identifies particular users and their historical engagement with the system. The user profile component may use the engagement data store 110 or a separate data store. In some cases, the system 100 may leverage third party data stores (e.g., a social network profile) for storing user profile information. Each user profile may include information such as the user's demographic information, authentication information (e.g., a username and password), information about a type of mobile device the user owns, historical interaction with the system 100, any points, rewards, badges, and the like earned by the user, and so forth. Upon electing to participate in an activity hosted by the system 100, the user may elect to sign in with the user's profile so that results of the user's participation can be stored with the system 100. By doing so, the user may earn discounts, prizes, and other benefits.

The activity input component 130 receives information for creating a new activity in the engagement data store. The activity input component 130 may provide a user interface, such as a web page, mobile application, desktop application, or programmatic interface through which administrative users associated with a particular sponsor or activity host enter information describing a particular activity. An activity may include a game, trivia, an educational sequence, or any other event in which users can participate and interact with other users. The activity input component 130 receives information related to the activity, such as trivia questions or other content of the activity, location criteria associated with the activity, user criteria associated with the activity, any limitations on number or type of participants, time/duration for the activity, and so on. After an administrative user inputs a new activity into the system 100, the activity input component 130 stores the activity in the engagement data store 110 for delivery at the appropriate time and to selected users.

The user location component 140 detects a user's location and eligibility for participating in a selected activity. In some cases, the location itself may inform the user about the activity (e.g., by displaying the activity on a theater screen), such that user's that are aware of an attempt to access the activity are permitted to do so. In other cases, users may run a mobile application that accesses location hardware (e.g., a global positioning system (GPS) chip, cell triangulation hardware, Wi-Fi location tracking hardware, and so forth) to determine the user's location and to present available activities or verify the user's eligibility for a preselected activity. The system 100 may also present a code or other information via the presentation component 180 that users can enter on their mobile device to verify their location and eligibility to participate in the activity.

The activity delivery component 150 delivers an activity to a user's mobile device for which the user is eligible. The delivery may include downloading an application from an application store or the web, accessing a web page, sending activity content to a mobile application already installed on the user's mobile device, or other method of delivery. The activity delivery component 150 continues to deliver activity content to the user for as long as the user is participating in the activity. For example, in the case of a multi-user quiz, the component 150 may deliver each question to each user's mobile device and display the questions on the device's screen (in addition to any larger, communal screen, such as a movie screen). The component 150 may also deliver any answer choices or provide space for the user to type, take photos, or provide any other type of answer/input related to the activity (described further with respect to the user input component 160). The component 150 may also leverage particular delivery mechanisms available to particular device platforms, such as push notifications, text messages, email messages, and so forth.

The user input component 160 receives input from each user participating in an activity, wherein the input is the user's participation in the activity. The component 160 may receive button clicks, pictures, speech, or any other type of input related to the activity in which the user is participating that the system 100 is delivering to the user. In the case of a quiz, the input may be in the form of pushing multiple-choice buttons. However, the activity may also ask the user to speak a name or make a sound into a microphone of the mobile device, to swipe a particular shape using touch input, or perform some other type of input related to the activity. The user input component 160 collects the input and communicates the input to the device aggregation component 170 via a network associated with the user's mobile device (e.g., a Wi-Fi or 3G Internet connection). The user input component 160 may also receive input via particular input mechanisms available to particular device platforms, such as text messages, email messages, and so forth.

The device aggregation component 170 aggregates user input from multiple user devices and applies the input to an activity being hosted by the system and in which each of the users is participating. The device aggregation component 170 may apply varying steps depending on the type of activity (e.g., supplied by an activity definition created during the activity input phase) to properly host the activity and carry out any processing defined during the activity input phase. For example, in the case of a quiz, the component 170 may determine which user answered quickest, how many users answered correctly, and so forth. From this information, the component 170 may create a display for forwarding to the presentation component 180 that displays screen names of users that reached the correct answer and that highlights a "winner" that answered the fastest. For other types of activities, the user input may be aggregated in different ways and lead to a different display of results.

The presentation component 180 uses equipment available at a location of multiple users to communally output information related to the hosted activity. The display may include a movie screen, other projector, JumboTron, sporting event scoreboard, television, or other display or other output device. The output may also include audio through speakers or other types of output (e.g., a laser light display based on noise collected at each user device). The presentation component 180 communicates via the network output information gathered by the device aggregation component 170 related to the current activity. The presentation component 180 fosters engagement with each of the users by providing a single point of reference for participation in the activity. The presentation component 180 may be the first location that users learn about the activity (e.g., a displayed banner inviting users to participate in the activity) as well as the location that users ultimately see the results of the activity (e.g., a winner or other displayed output).

The computing device on which the local engagement system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
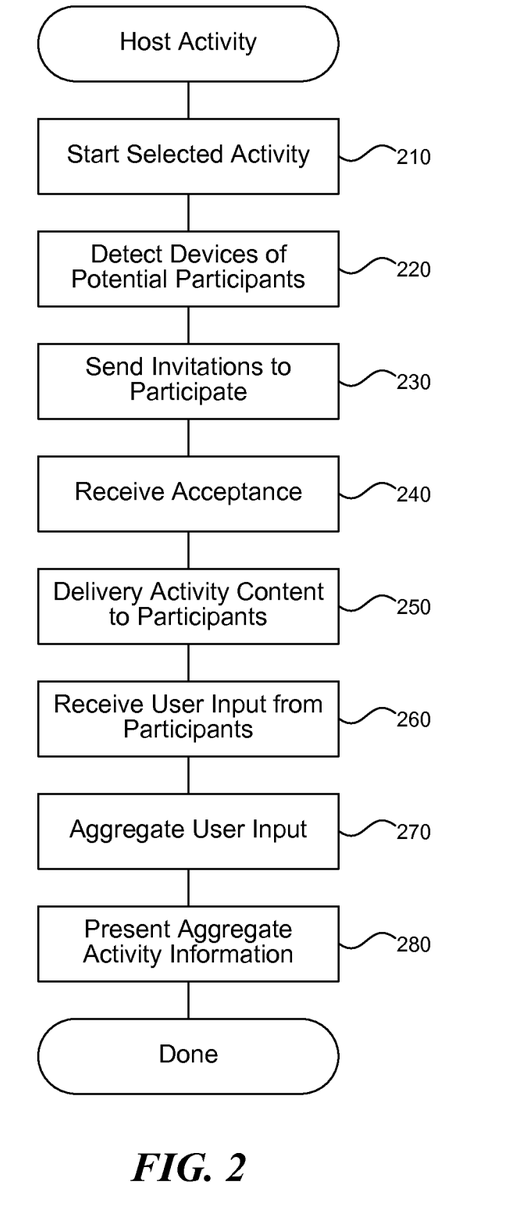
FIG. 2 is a flow diagram that illustrates processing of the local engagement system to host an activity dynamically among devices at the same location, in one embodiment.

FIG. 2 is a flow diagram that illustrates processing of the local engagement system to host an activity dynamically among devices at the same location, in one embodiment.

Beginning in block 210, the system starts a selected activity based on a start time or event associated with the activity. The activity may include any predefined user engagement content defined by an event sponsor or administrator. The activity may be a trivia-based quiz, other audience participation type event, education event, or other type of entertainment or educational content. The system starts the activity at a pre-appointed time, such as 30 minutes before a movie or concert starts, and runs the activity until a specified duration expires, such as 5 minutes before the movie or concert starts or when the activity is complete (e.g., all of the questions of a quiz have been delivered and answered).

Continuing in block 220, the system detects one or more devices that can potentially participate in the activity. In some cases, the system may determine via some proximity that any device in the area can participate. For example, the system may use a web proxy to display a default web page related to the activity to all of the users connecting to the Internet through a particular Wi-Fi access point. In some cases, the system may not detect devices and instead rely on users to discover the activity themselves through other avenues. For example, the system may present an invitation to participate in the activity on a movie screen or other communally visible display or announce the activity over loudspeakers. In the case of detecting devices, the system may also identify potential users so that only users meeting certain criteria can be invited to join the activity. For some activities, there may be different user groups that receive different invitations. For example, the system may host a "girls versus guys" quiz in a theater in which males are invited to join one group and females are invited to join another. This information is available in the user profile information described herein.

Continuing in block 230, the system sends an invitation to participate in the activity to multiple users of the system that are located in an identified location associated with the activity. For example, the system may display an invitation to join the activity with instructions for doing so on a large screen or may send a push notification to devices in range to participate in the activity. The invitation may include instructions to participate such as navigating to a particular web address (e.g., via a Uniform Resource Identifier (URI)), download a particular application, send an email to a particular address, and so forth.

Continuing in block 240, the system receives an acceptance of the invitation from one or more invited users and adds the accepting users to a list of participants in the activity. The users may accept by visiting a web page, running a downloaded application, sending an email message, or providing some other indication in kind with the received invitation. In some cases, the system may perform a handshake to identify users and ensure eligibility by asking the users to sign into a profile created with the system and performing any related verification steps (e.g., entering a username and password).

Continuing in block 250, the system delivers activity content to the participants in the activity by communicating with each user's mobile device. The activity contents may include questions, answer input controls, instructions, images, audio-visual information, or any other type of content created by an activity sponsor for a particular activity. The system is designed to support a wide variety of activity types and may provide common controls for building activities but also offers a large amount of flexibility for activity sponsors to create new activity types. Thus, while the description herein provides a generic explanation and examples of the operation of the system, those of ordinary skill in the art will recognize numerous possible extensions and adaptations within the scope of the material provided herein.

Continuing in block 260, the system receives user input from each of multiple users related to participation in the activity. The user input may include an answer to a question, sound, touch input, or any other type of input. The system communicates via a network, such as a Wi-Fi or 3G network, with each user's device to provide activity content and to receive user input. The system may also measure the speed, correctness, or other qualities or characteristics of each user's input to determine a score or other measurement of success with respect to the activity.

Continuing in block 270, the system aggregates input from participating users and determines an outcome of the activity. The system may aggregate answers or other input information, determine users associated with correct answers, determine a user that provided a fastest correct answer, and so forth. In some cases, the system allows activity creators to provide custom software logic that runs in a cloud-based datacenter or is otherwise hosted by the system to perform custom aggregation of user input related to the creator's activity. The system invokes this custom logic at this point to aggregate the user input and determine next steps of an activity. The system may perform the previous steps many times, delivering new content, receiving new input, and aggregating that input to produce an outcome, until all of the steps associated with the activity are complete. The system may also associate points with each user's response and update the user's profile so that the user can earn rewards for participating.

Continuing in block 280, the system presents the outcome of the activity using communally accessible output equipment to each of the participating users. The equipment may include loudspeakers, a movie screen, a scoreboard, or other equipment that each of the participants can access (e.g., visibly, audibly, or otherwise). The system may present a correct answer, a list of users that answered correctly, a winning or fastest answer, and other information related to the outcome of the particular activity. After block 280, these steps conclude.

Figure 3:
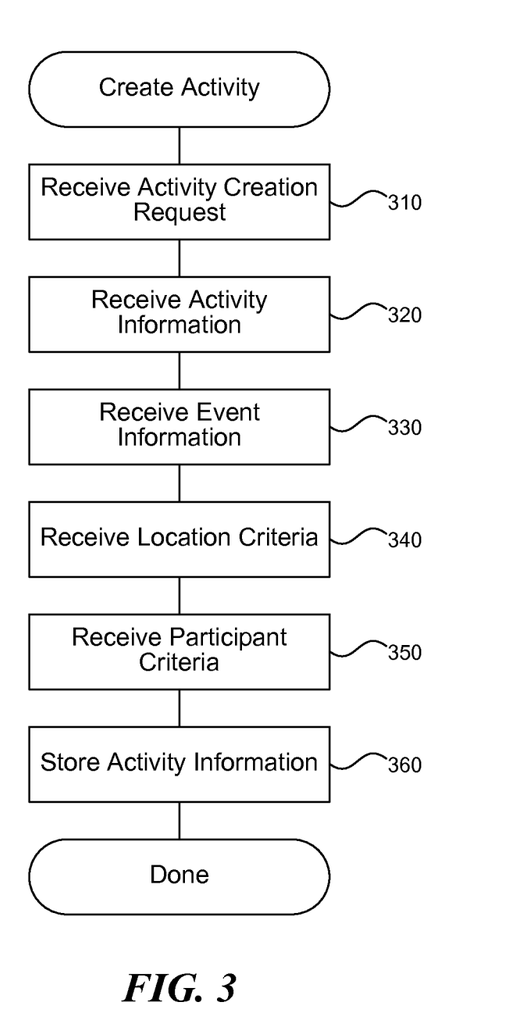
FIG. 3 is a flow diagram that illustrates processing of the local engagement system to create an activity for engaging devices arriving at a location, in one embodiment.

FIG. 3 is a flow diagram that illustrates processing of the local engagement system to create an activity for engaging devices arriving at a location, in one embodiment. Beginning in block 310, the system receives a request to create an ad-hoc activity that users visiting the location can dynamically join to participate together. The request may arrive via an event creator accessing a web page, running a mobile application, or performing another action to access the system through an administrative interface for creating activities provided by the system.

Continuing in block 320, the system receives information related to the created activity. The information may include content related to the activity (e.g., a list of questions or audiovisual content), a range of acceptable user responses (e.g., multiple-choice answers to questions), and so on. The system may provide a design interface through which the activity creator can create multiple screens of information associated with the activity and store the created activity.

Continuing in block 330, the system receives event information that defines a time that the activity will be presented to participating users. The event information may include an absolute time (e.g., 10 PM PST) or a time relative to some other event (e.g., 30 minutes before a concert begins, after 100 attendees have arrived, and so forth). The event information may also include a duration or end time for the activity, or a condition under which the activity ends.

Continuing in block 340, the system receives one or more location criteria that determine a geographical scope of users that can participate in the activity. For example, the location criteria may include users within a particular theater or concert hall, users within range of a particular Wi-Fi access point, users that enter a code displayed in a room on their device, and so forth. The system typically encourages users co-located to participate in an activity and thus the location forms the group of people that are eligible for the activity.

Continuing in block 350, the system receives one or more participant criteria that define types of users that are eligible to participate in the activity. Some activities may include eligibility criteria based on profile information such as demographic information, while other activities may break users into groups and may have eligibility requirements for each groups. For example, a particular question may be presented just to dads in an audience, just to women, just to those who vote Republican, and so forth.

Continuing in block 360, the system stores information associated with the created activity in an engagement data store for subsequent access during the scope of the activity. The activity information includes the received content, event information, location criteria, and participant criteria, and may include any custom software logic or hosting requirements related to the activity as specified by the activity creator. The data store may store a variety of activities for access by specific venues or by particular categories of venues. For example, the data store may include a set of activities that any bar can access and host from the cloud. After block 360, these steps conclude.

In some embodiments, the local engagement system stores and presents cross-venue information. For example, a particular activity may involve a competition between attendees in two different theaters across the country. These two theaters may compete and the winning theater may receive a prize, such as a free concession. The system may also store historically aggregated information for each venue. For example, the system may store and present an all-time average or high score for participants at a particular concert hall, fastest answers to a particular question, and so forth. In this way, participants can compete not only against currently present participants, but also against past greatest participants as well as potentially participants at other venues and at other presentations of the activity.

In some embodiments, the local engagement system provides rewards for user participation and achievements with respect to activities. For example, the system may deliver a code to the winner of a trivia quiz that provides that user with free popcorn at a concession stand or other prizes or discounts. The system may also allow the user to accumulate prizes over time by repeat participation with the system in various hosted activities.

In some embodiments, the local engagement system hosts on-going activities that follow a user as the user moves from location to location. For example, the system may start a scavenger hunt with users that start at a particular location, and then follow the users as they move to new locations to find items requested by the scavenger hunt activity. The system may also host an on-going quiz that runs for days and allows users to connect at their leisure to continue their participation. Users may develop friends among other participants that the system allows the users to connect with over time.

In some embodiments, the local engagement system re-engages users after an event to collect market research information. For example, the system may initially engage users in a trivia game before a movie, and then ask users to rate the movie after the movie ends. The system may provide this information to the venue or show sponsor so that shows can be improved or payments can be calculated based on user satisfaction. In some cases, the system may allow users to effect the event such as choosing a movie outcome as the movie goes or choosing a concert set list as the concert proceeds.

In some embodiments, the local engagement system rewards activity participants with exclusive content related to an event. For example, participants in an activity before a concert may be rewarded with a downloadable MP3 of the concert headliner after the show. This rewards the user for attending and for participating in the activity.

In some embodiments, the local engagement system captures real time information from participants during the event. For example, the system may ask users to rate a TV show or movie as the show plays or may receive dial testing information from people watching a political events that indicates the people's agreement or disagreement with the event content.

From the foregoing, it will be appreciated that specific embodiments of the local engagement system have been described herein for purposes of illustration, but that various modifications may be made without deviating from the spirit and scope of the invention. Accordingly, the invention is not limited except as by the appended claims.

We claim:

1. A computer-implemented method to host an activity dynamically among devices at the same location, the method comprising:
   starting a selected activity based on a start time or event associated with the activity;
   detecting one or more devices that can potentially participate in the activity;
   sending an invitation to participate in the activity to multiple users of a system that are located in an identified location associated with the activity, and wherein the invitation is sent to those of the multiple users whose profiles meet a determined criteria for the activity and not sent to those users whose profiles do not meet the determined criteria for the activity;
   receiving an acceptance of the invitation from one or more invited users and adding the accepting users to a list of participants in the activity, the acceptance comprising receiving an indication that the one or more users ran a particular downloaded application, and performing a handshake to identify users and ensure eligibility by asking the users to sign into a user profile to verify that the user's user profile meets the determined criteria for the activity;
   delivering activity content to the participants in the activity by communicating with each user's mobile device;
   receiving user input from each of multiple users related to participation in the activity;
   aggregating input from participating users and determining an outcome of the activity; and
   presenting the outcome of the activity using communally accessible output equipment to each of the participating users,
   wherein the preceding steps are performed by at least one processor.

2. The method of claim 1 wherein starting the selected activity comprises displaying predefined user engagement content defined by an event sponsor.

3. The method of claim 1 wherein starting the selected activity comprises starting a trivia-based quiz.

4. The method of claim 1 wherein starting the selected activity comprises starting the activity at a pre-appointed time and running the activity until a specified duration expires.

5. The method of claim 1 wherein detecting devices comprises determining via a defined proximity that any device in the area can participate.

6. The method of claim 1 wherein detecting devices comprises identifying potential users so that only users meeting certain criteria can be invited to join the activity.

7. The method of claim 1 wherein receiving the acceptance further comprises receiving an indication that a user visited a web page.

8. The method of claim 1 wherein delivering activity content comprises delivering at least one of questions, answer input controls, instructions, images, and audiovisual information.

9. The method of claim 1 wherein delivering activity content comprises delivering one or more advertisements to each user's device.

10. The method of claim 1 wherein receiving user input comprises measuring speed, correctness, or other qualities or characteristics of each user's input to determine a score or other measurement of success with respect to the activity.

11. The method of claim 1 wherein aggregating input comprises invoking custom software logic provided by a creator of the activity that runs in a cloud-based datacenter to perform custom aggregation of user input related to the activity.

12. The method of claim 1 wherein aggregating input comprises associating points with each user's response and update the user's profile so that the user can earn rewards for participating in the activity.

13. The method of claim 1 wherein presenting the outcome comprises presenting a correct answer, a list of users that answered correctly, a winning or fastest answer, and other information related to the outcome of the particular activity.

14. A computer system for providing an ad-hoc user and device engagement platform, the system comprising:
   a processor and memory configured to execute software instructions embodied within the following components;
   an engagement data store that stores one or more interactive activities to dynamically engage users at an identified location;
   a user profile component that stores user profile information that identifies particular users, leverages at least one third party data store having user profile information for creating a user's profile, and their historical engagement with the system;
   an activity input component that receives information for creating a new interactive activity in the engagement data store, the activity input component further receiving information defining eligibility requirements for participating in the interactive activity;
   a user location component that detects a user's location and eligibility for participating in a selected activity, and receives a code from the user indicating that the user is at a determined location;
   an activity delivery component that delivers an interactive activity to a user's mobile device for which the user is eligible;
   a user input component that receives input from each user participating in an interactive activity, wherein the input is the user's participation in the interactive activity and wherein the user input component collects the input and communicates the input to a device aggregation component via a network associated with the user's mobile device;

a device aggregation component that aggregates user input from multiple user devices and applies the input to an activity being hosted by the system and in which each of the users is participating; and a presentation component that uses equipment available at a location of multiple users to communally output information related to the hosted activity, and further presents to the multiple users the code indicating that the user is at the determined location.

15. The system of claim 14 wherein the user profile component stores at least one of demographic information, authentication information, information about a type of mobile device the user owns, historical interaction with the system, and points earned by the user for participating in activities.

16. The system of claim 14 wherein the activity input component provides a graphical user interface through which administrative users associated with a particular sponsor or activity host enter information describing a particular activity.

17. The system of claim 14 wherein the device aggregation component applies a set of steps determined by an activity definition to host the activity and carry out any processing defined to the activity input component.

18. The system of claim 14 wherein the presentation component displays information on a movie screen, projector, jumboTron, sporting event scoreboard, television, or other display located at a venue and visible to each of the participants.

* * * * *